United States Patent Office 3,235,331
Patented Feb. 15, 1966

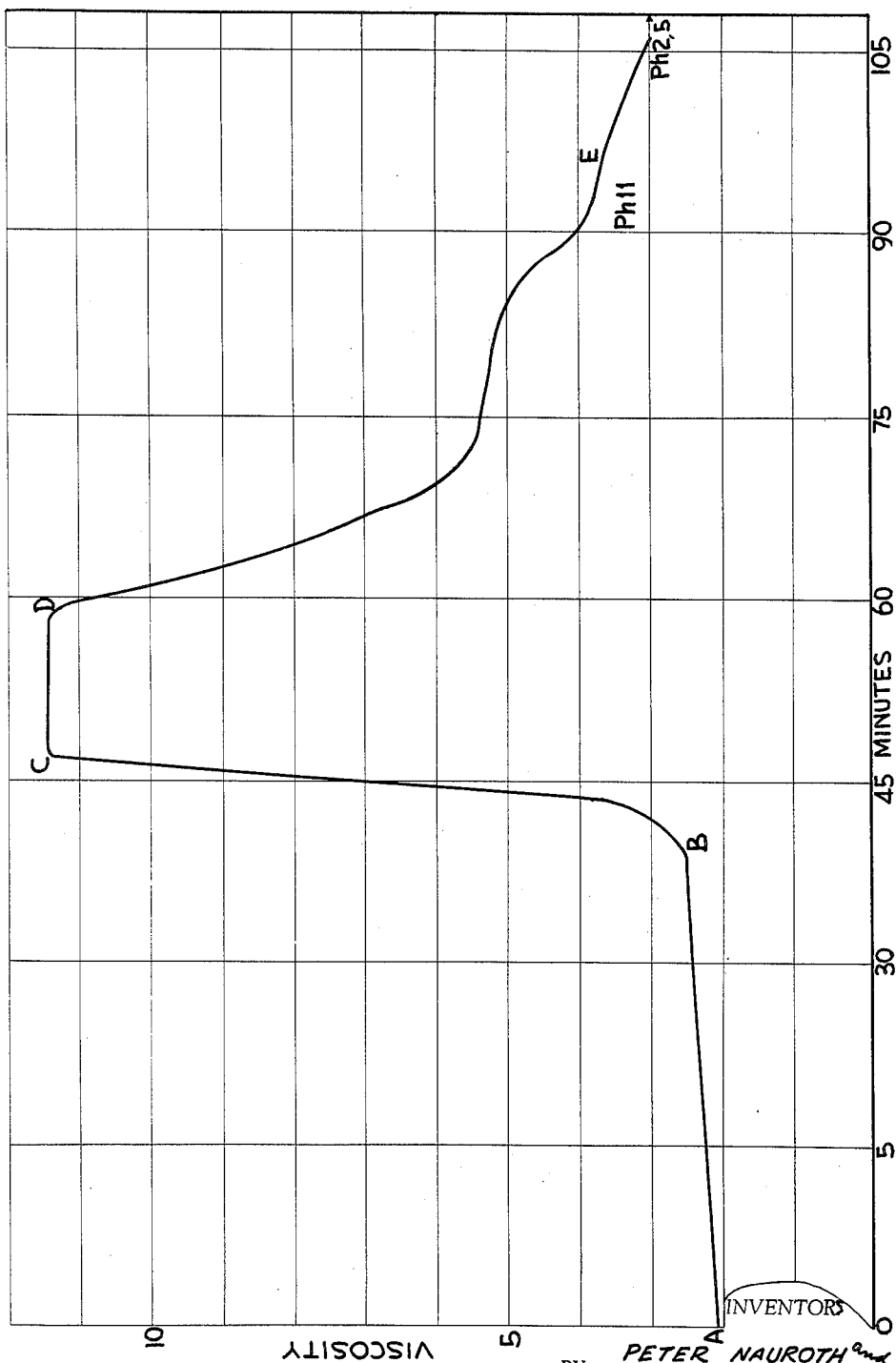

3,235,331
METHOD OF PRODUCING FINELY DIVIDED
SILICEOUS PIGMENTS
Peter Nauroth and Adam Becker, Wesseling, Bezirk Cologne, Germany, assignors to Deutsche Gold- und Silber-Scheideanstalt vormals Roessler, Frankfurt am Main, Germany, a corporation of Germany
Filed Mar. 2, 1962, Ser. No. 176,927
11 Claims. (Cl. 23—182)

This invention relates to a method of producing finely divided siliceous pigments by reacting aqueous alkali metal silicate solutions, such as aqueous sodium silicate solutions, with an acidification agent.

It is known to produce finely divided silica by reaction of an acidification agent with aqueous alkali metal silicates by various methods. In one typical method, a mineral acid is added to an alkali metal silicate solution which contains certain neutral salts of strong acids and strong bases, such as sodium chloride or sodium sulfate. In that process the precipitation is effected in a manner such that the ratio of the initial salt concentration to the final salt concentration ranges between 1 to 1.5 and 1 to 5.0.

In accordance with another method, a prepared solution of alkali metal silicate is gradually reacted with an acidification agent by adding the agent to the alkali metal silicate at a controlled rate.

In any case, the problem of producing a finely divided silica having an average ultimate particle size between 0.1 and 0.03 micron has been considered to be quite complex. In order to obtain a pigment of this character which is capable of effectively reinforcing rubber to a maximum degree, it has hitherto been regarded as essential, or at least preferable, to conduct the precipitation under conditions such that the surface area of the product is below 200 square meters per gram as measured by the Brunauer-Emmett-Teller method of determining surface area by nitrogen adsorption.

In accordance with the present invention there has been provided a new and simple method of precipitating silica which is capable of effectively reinforcing rubber and which has the particle size desired as specified above. Surprisingly, this pigment is found to reinforce effectively rubber even when its surface area is found to be above 200 square meters per gram. Thus, the new method provides a means of producing silica which is an effective rubber reinforcing agent, and which has the above mentioned average ultimate particle size, without resorting to precautions to ensure that the surface area of the product falls within any particular range.

According to the invention herein contemplated, a pool of aqueous alkali metal silicate solution is established, for example, by introduction of the alkali metal silicate into a tank or like reactor, and aqueous alkali metal silicate and acid are simultaneously added to the pool. This simultaneous addition is continued until the viscosity of the pool rises through a maximum and then falls to a substantially lower value. For most purposes this lower value should not be more than three times the initial viscosity of the alkali metal silicate pool.

The time-viscosity curve of a typical reaction is shown schematically in FIG. 1 of the accompanying drawing, which shows a curve illustrating the course of viscosity increase as acid and alkali metal silicate solution are added to a pool of alkali metal silicate as herein contemplated. In this graph the vertical axis illustrates the relative viscosity of the alkali metal silicate solution as the reaction proceeds and the horizontal axis illustrates the time of precipitation in minutes. Thus, the curve indicates that at the beginning of addition of alkali metal silicate and acid (time zero) which is denoted as point A, the viscosity is slightly over 2. As addition of acid and alkali metal silicate is continued up to about 33 minutes (point B), the viscosity does not change to any appreciable extent. Thereafter, the viscosity rapidly increases to a maximum of approximately 11.5 (point C). Following this, the viscosity remains at this level for a short time (in this case, approximately 10 minutes) while silicon dioxide precipitates. From point D, which is about after 60 minutes of addition, the viscosity falls rapidly until it reaches a value of about 3.8 at 98 minutes. If addition of the alkali metal silicate solution is discontinued at this point and further acid is added until the pH of the slurry is about 2.5, the viscosity falls to even a greater degree.

In the curve mentioned above, the viscosity is expressed simply in calibrated units. The exact viscosity is not specified. However, the maximum viscosity rarely exceeds 30 points. The alkali metal silicate solution which forms the initial pool normally should have a pH of substantially 10 to 12. This can be achieved conveniently by adding alkali metal silicate to the pool and then adding an acidification agent, such as sulphuric acid, to the pool until the pH of the solution falls to the desired range.

As a general rule, the concentration of alkali metal silicate in the initial pool is low, rarely exceeding about 25 grams of $SiO_2$ per liter of solution, but usually at least 5 or 10 grams of $SiO_2$ per liter. On the other hand, the alkali metal silicate which is added to the solution usually contains in excess of 50 grams per liter of $SiO_2$, preferably between 60 and 250 grams per liter of $SiO_2$. Furthermore, addition of silicate solution normally is continued until the resulting slurry contains at least about 50 grams per liter of $SiO_2$, but rarely above 150 grams per liter of $SiO_2$.

Acidification agent is added simultaneously with the addition of the alkali metal silicate. The amount of this agent and the alkali metal silicate are so proportioned as to maintain the pH of the resulting slurry substantially constant throughout the major portion of the reaction (at least 50 to 75 percent thereof) in the range of about 10 to 12.

In order to obtain best results, it is important that the initial alkali metal silicate solution be essentially free from pre-formed silica nuclei. Thus, the reactor in which the reaction is conducted should be clean and substantially free from such nuclei. In practice, a process of this character normally is conducted in a series of batches in which the silica is precipitated and recovered from the reactor. Unless the reactor is well washed after such an operation, seeds or silica nuclei will be found to be present in substantial amount in the tank. This seriously impairs the rubber reinforcing properties of the ultimate silica produced.

After the precipitation has been completed and the alkali metal silicate has been added, it is generally found desirable to add a further amount of acid to reduce the pH of the silica slurry to 7 or below. In general, it is advantageous to add enough acid to the precipitated silica to produce a slurry having a pH below 5, for example, in the range of about 2.5. Thereafter, the silica is recovered from the aqueous medium.

If desired, the silica may be dried at a suitable drying temperature, for example, 100 to 300° C. Alternatively, the silica may be recovered by other means and used in rubber without drying, such as by latex compounding techniques or the like.

When proceeding in accordance with the method of the present invention, a relatively pure silicon dioxide is obtained containing in excess of 90 percent $SiO_2$ on the anhydrous basis (a basis free from bound water and free water) and usually containing 98 to 99 percent or more SiO₂ on the anhydrous basis. The specific surface area of the product may range as high as 240 to 260 square meters per gram, as measured by the B-E-T nitrogen absorption method. However, if the silica is subjected to heat treatment for the required length of time, this surface area may be reduced substantially, for example, to as low as 100 to 150 square meters per gram.

Surprisingly, however, the dried silica, even when it has a surface area as high as 260 square meters per gram or even somewhat higher, is a valuable reinforcing pigment in rubber. Natural rubber or synthetic rubber reinforced with this material shows a high degree of transparency due to the fine distribution of the silica particles in the rubber and also exhibits excellent mechanical properties.

The alkali metal silicate used normally is sodium silicate having the formula $Na_2O(SiO_2)_x$, where $x$ ranges from about 2 to 5. For most purposes the aqueous sodium silicate $Na_2O(SiO_2)_{3.3}$ is satisfactory. Alkali metal silicates of other alkali metals, such as potassium silicate, may be used if desired. However, these materials are more expensive.

The process normally is conducted at a temperature above 50° C. For most purposes a temperature of 80 to 90° C. is maintained in the reaction medium during the precipitation.

The following example is illustrative:

*Example*

11.1 liters of water heated to a temperature of 80° C. were placed in an 80-liter container. An aqueous solution of sodium silicate having the composition $Na_2O(SiO_2)_{3.3}$ was added to the water to produce a sodium silicate solution containing about 13 grams of SiO₂ per liter, the pH of the solution having been adjusted by addition of acid to a pH of about 10. Thereafter, the reaction mixture was held at a temperature of 86° C. During a period of 100 minutes, an aqueous sodium silicate solution containing sodium silicate of the composition $Na_2O(SiO_2)_{3.3}$ and a specific gravity of 1.063 was added to the pool while simultaneously adding a sulphuric acid solution containing 90 grams of $H_2SO_4$ per liter. The rate of addition of the acid was about one-third to one-fourth the rate of addition of the alkali metal silicate solution. The pH of the solution is maintained in the range of about 10 to 11.5. In the course of the addition which took a period of 100 minutes, the viscosity rose, as illustrated in the drawing, from 2.2 units ultimately to 11.5 units and finally fell (at point E) to about 3.8 units. Addition of acid and alkali metal silicate was continued, maintaining the pH in the range specified, for about 100 minutes. Thereafter, the resulting silica slurry which contained about 50 grams of SiO₂ per liter was further acidified to a pH of 7 and ultimately to a pH of 2.5. Following this, the silica was recovered and dried. It has a surface area of about 250 square meters per gram and an average ultimate particle size of 0.01 to 0.03 micron.

In the above example, sulphuric acid was used as the acidification agent. Various other acidification agents may be used, including carbon dioxide, hydrochloric acid, ammonium chloride, and like acidification agents commonly used to react with sodium silicate to produce a siliceous product.

Although the present invention has been described wth reference to the specific details of certain embodiments thereof, it is not intended that such details shall be regarded as limitations upon the scope of the invention except insofar as included in the accompanying claims.

What is claimed:

1. A method of preparing finely divided siliceous pigment which comprises establishing an aqueous pool of alkali metal silicate containing from 5 to 25 grams per liter of SiO₂ and having a pH of 10 to 12, adding separately to the pool further alkali metal silicate and an acidification agent reactive with alkali metal silicate to produce siliceous product, and continuing said addition of acidification agent and said silicate until the SiO₂ content of the slurry is at least about 50 grams per liter and the viscosity of the pool rises through a maximum and then falls to a substantially lower viscosity than said maximum viscosity and proportioning the amount of alkali metal silicate and acidification agent being added whereby to maintain the pH of the pool at 10 to 11.5 throughout the major portion of the reaction.

2. A method of preparing a finely divided siliceous pigment which comprises establishing a pool of aqueous alkali metal silicate containing less than 25 grams per liter of SiO₂, adding an acidification agent reactive with alkali metal silicate to produce siliceous product to adjust the pH of the pool to 10 to 12, thereafter simultaneously and separately adding acid reactive with alkali metal silicate to produce siliceous product and further alkali metal silicate solution containing at least 50 grams of SiO₂ per liter of solution to said pool while proportioning the amount of alkali metal silicate and acid being so added to hold the pH at 11.5, and continuing said addition until the viscosity of the resulting slurry falls to a level not greater than three times the viscosity of the initial pool.

3. The process of claim 2 wherein the pool of aqueous alkali metal silicate is initially free from pre-formed silica nuclei.

4. The method of claim 2 wherein the alkali metal silicate is sodium silicate.

5. A method of preparing a finely divided siliceous pigment which comprises establishing a pool of aqueous alkali metal silicate containing from 5 to 25 grams per liter of SiO₂, adding sufficient acidification agent reactive with alkali metal silicate to produce siliceous product to adjust the pool to pH 10 to 12, thereafter simultaneously and separately adding an acidification agent reactive with alkali metal silicate to produce siliceous product and further alkali metal silicate solution containing 50 to 250 grams per liter of SiO₂ to said pool, proportioning the acidification agent and alkali metal silicate solution being so added to maintain the pool pH substantially constant throughout the major portion of the reaction in the range of about 10 to 12, and continuing said addition until the SiO₂ content of the slurry is more than 50 grams per liter but less than 150 grams per liter and until the viscosity of the resulting slurry falls to a level not greater than three times the viscosity of the initial pool.

6. A method of preparing finely divided siliceous pigment which comprises establishing an aqueous pool of alkali metal silicate containing from 5 to 25 grams per liter of SiO₂ and having a pH in the range of about 10 to 12, adding separately to the pool alkali metal silicate solution containing in excess of 50 grams per liter of SiO₂ and an acidification agent reactive with alkali metal silicate to produce siliceous product, continuing said addition of acidification agent and said silicate solution until the SiO₂ content of the slurry is at least about 50 grams per liter of SiO₂ and the viscosity of the pool rises through a maximum and then falls to a substantially lower viscosity than said maximum viscosity and proportioning the amount of alkali metal silicate and acidification agent being added whereby to maintain the pH of the pool in the range of about 10 to 11.5 throughout the major portion of the reaction.

7. The process of claim 6 wherein a further amount of acid is added after the silica slurry is produced to reduce the pH of the silica slurry to below about 7.

8. The process of claim 6 wherein the process is conducted at a temperature in the range of from 50° C. to 90° C.

9. The method of claim 6 wherein the addition of acidfication agent and silicate are continued until the viscosity falls to a value which is not more than three times the viscosity of the initial alkali metal silicate pool.

10. The process of claim 6 wherein the acidification agent and alkali metal silicate solution are added until the resulting silica slurry contains at least 50 grams but less than 150 grams of $SiO_2$ per liter.

11. A method of preparing a finely divided siliceous pigment which comprises establishing a pool of aqueous alkali metal silicate containing less than 25 grams per liter of $SiO_2$, adding an acidification agent reactive with alkali metal silicate to produce siliceous product to adjust the pH of the pool to in the range of about 10 to 12, thereafter simultaneously and separately adding acid reactive with alkali metal silicate to produce siliceous product and further alkali metal silicate solution containing at least 50 grams of $SiO_2$ per liter of solution to said pool while proportioning the amount of alkali metal silicate and acid being so added to hold the pH in the range of about 10 to 12 throughout the major portion of the reaction, and continuing said addition until the viscosity of the resulting slurry falls to a level not greater than three times the viscosity of the initial pool.

References Cited by the Examiner
UNITED STATES PATENTS

| | | | |
|---|---|---|---|
| 2,358,201 | 9/1944 | Behrman | 23—182 |
| 2,496,736 | 2/1950 | Maloney | 23—192 |

MAURICE A. BRINDISI, *Primary Examiner.*